United States Patent Office 3,353,522
Patented Nov. 21, 1967

3,353,522
INTERNAL COMBUSTION PISTON ENGINES
Ralph Gilbert Ley, Stamford, England, assignor to Blackstone & Company Limited, Stamford, England
Filed Mar. 2, 1965, Ser. No. 436,620
Claims priority, application Great Britain, Mar. 3, 1964, 9,004/64
4 Claims. (Cl. 123—41.31)

ABSTRACT OF THE DISCLOSURE

A liquid-cooled cylinder head for a fuel injection internal combustion piston engine defines a part spherical combustion chamber connected to inlet air and exhaust gas passages control by respective poppet valves. The seats for the poppet valves lie in respective inclined planes tangential to the combustion chamber so that their stems are inclined away from each other, and a fuel injector is arranged between the poppet valves. A first coolant chamber is arranged immediately adjacent the wall of the cylinder head defining the combustion chamber and is connected by a coolant passage to a second coolant chamber which is separated from the combustion chamber by the first coolant chamber. Cooling water is passed through a coolant inlet into the second coolant chamber and flows through the coolant passage into the first coolant chamber and then to a coolant outlet. The coolant passage directs a jet of cooling water to impinge on the cylinder head wall defining the combustion chamber between the fuel injector and the seats for the poppet valves.

---

The invention relates to a liquid-cooled cylinder head for a fuel injection internal combustion piston engine. A cylinder head essentially defines a surface forming one boundary of a combustion chamber and, in the case of an engine of the overhead valve type, also defines at least one air inlet passage and at least one exhaust gas passage and is arranged to support valves for controlling these passages. Additionally, in the case of a fuel injection engine, the cylinder head is also provided with a passage for a fuel injector extending through an outer wall of the cylinder head to the said surface forming a boundary of the combustion chamber.

In order to maintain the operating temperatures of the valves for the inlet and exhaust passages, of the fuel injector and of the material forming the cylinder head at desired values, it is well-known to provide a cylinder head with passages for the circulation of a liquid coolant. However, difficulties are often experienced in controlling the heat transfer between the parts to be cooled and the liquid coolant. It is an object of this invention to provide a liquid-cooled cylinder head, for a fuel injection internal combustion engine, in which the coolant passages are arranged in an improved manner.

According to the invention a liquid-cooled cylinder head, for an internal combustion piston engine, has a wall in the cylinder head separating a first coolant chamber from a second coolant chamber, the first coolant chamber is arranged immediately adjacent a portion of the cylinder head defining a substantially part spherical surface for forming a boundary of a combustion chamber and is provided with a coolant outlet, the second coolant chamber is separated from the said portion of the cylinder head by the first coolant chamber and is provided with a coolant inlet, the cylinder head defines an air inlet passage and an exhaust gas passage and is arranged to support a poppet valve for controlling the air inlet passage and a poppet valve for controlling the exhaust gas passage, the cylinder head is arranged to support said poppet valves such that the head of each poppet valve will engage a respective valve seat lying in a plane substantially tangential to the said substantially part spherical surface such that the stems of the poppet valves will be inclined away from each other, the cylinder head is arranged to support a fuel injector intermediate said valve seats, and a coolant passage is formed in the said wall separating the first coolant chamber from the second coolant chamber and is arranged to direct a flow of coolant to impinge on the portion of the cylinder head intermediate said valve seats and said fuel injector.

The coolant passage is preferably arranged so that the fuel injector will pass through it, whereby coolant will flow from the second coolant chamber through the annular space defined between the passage and the fuel injector. Preferably the coolant passage is formed as an axially elongated nozzle for producing a high velocity jet of coolant directed to impinge on the said portion of the cylinder head intermediate said valve seats and said fuel injector. Preferably a sleeve is provided for separating the fuel injector from the coolant, and one end of the sleeve is sealingly engaged with the said portion of the cylinder head and the other end of the sleeve is sealingly engaged with an outer wall of the cylinder head.

When the cylinder head is to be secured to a liquid-cooled cylinder block, the coolant inlet to the second coolant chamber is preferably provided by at least one duct extending from the second coolant chamber through the cylinder head to a surface which is to abut the cylinder block through an intermediate seal, whereby coolant will flow from the cylinder block through an appropriate port formed in the seal to the said duct.

The first coolant chamber preferably surrounds the exhaust gas passage, a second coolant inlet is formed in the cylinder head to deliver coolant directly into the first coolant chamber, and the second coolant inlet is arranged to direct a flow of coolant to impinge on said exhaust gas passage. Preferably the coolant outlet is arranged adjacent the exhaust gas passage whereby substantially all the coolant that flows through the cylinder head will also flow over the exhaust gas passage and a valve guide for a poppet valve controlling the exhaust gas passage extends through the first coolant chamber and is provided with at least one cooling fin for the transference of heat from the valve guide to the coolant.

The invention is now described, by way of example only, with reference to the accompanying drawings, in which.

Figure 1:
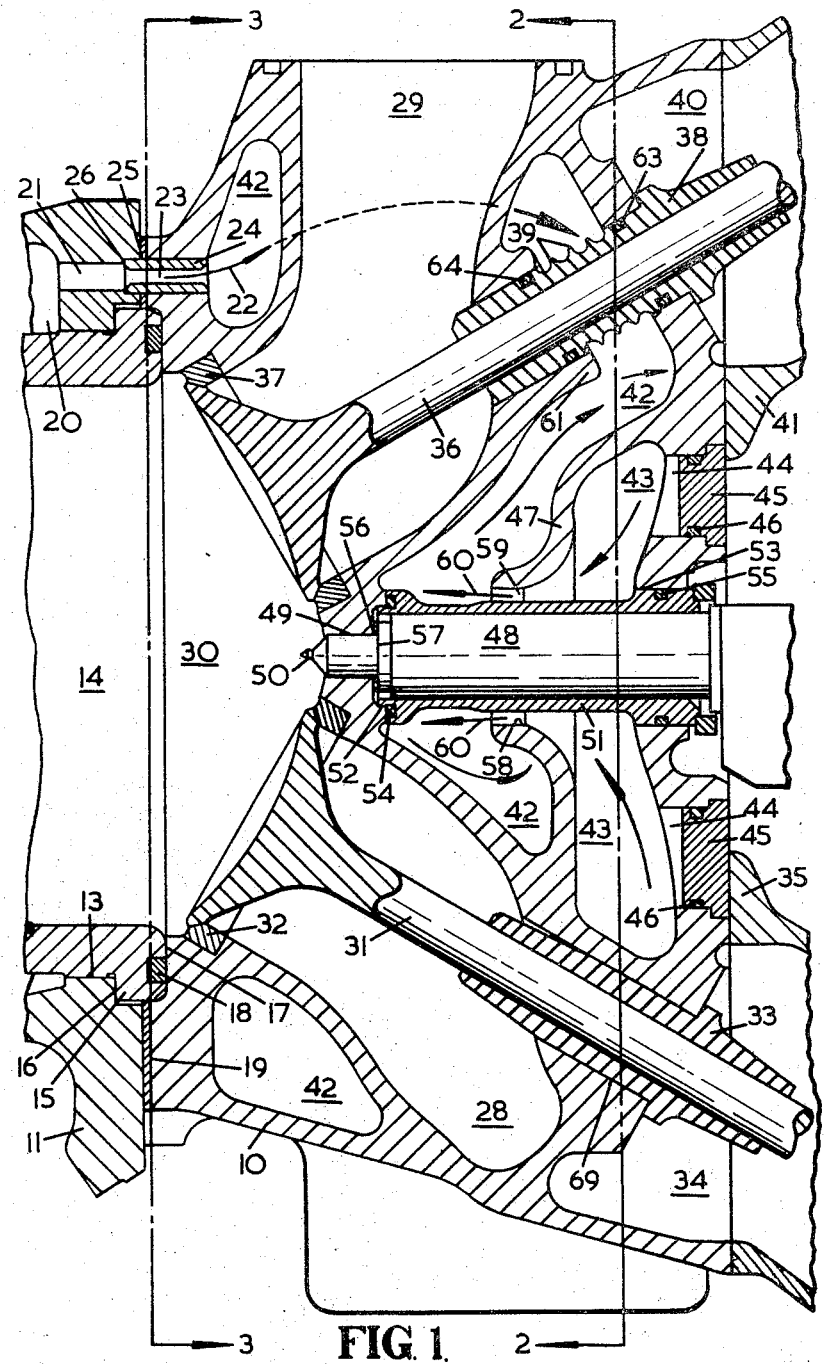
FIGURE 1 is a transverse section through a water-cooled cylinder head as if taken along the line 1—1 of FIGURE 2, and additionally showing part of the cylinder block, part of a fuel injector, and part of two poppet valves.
Figure 2:
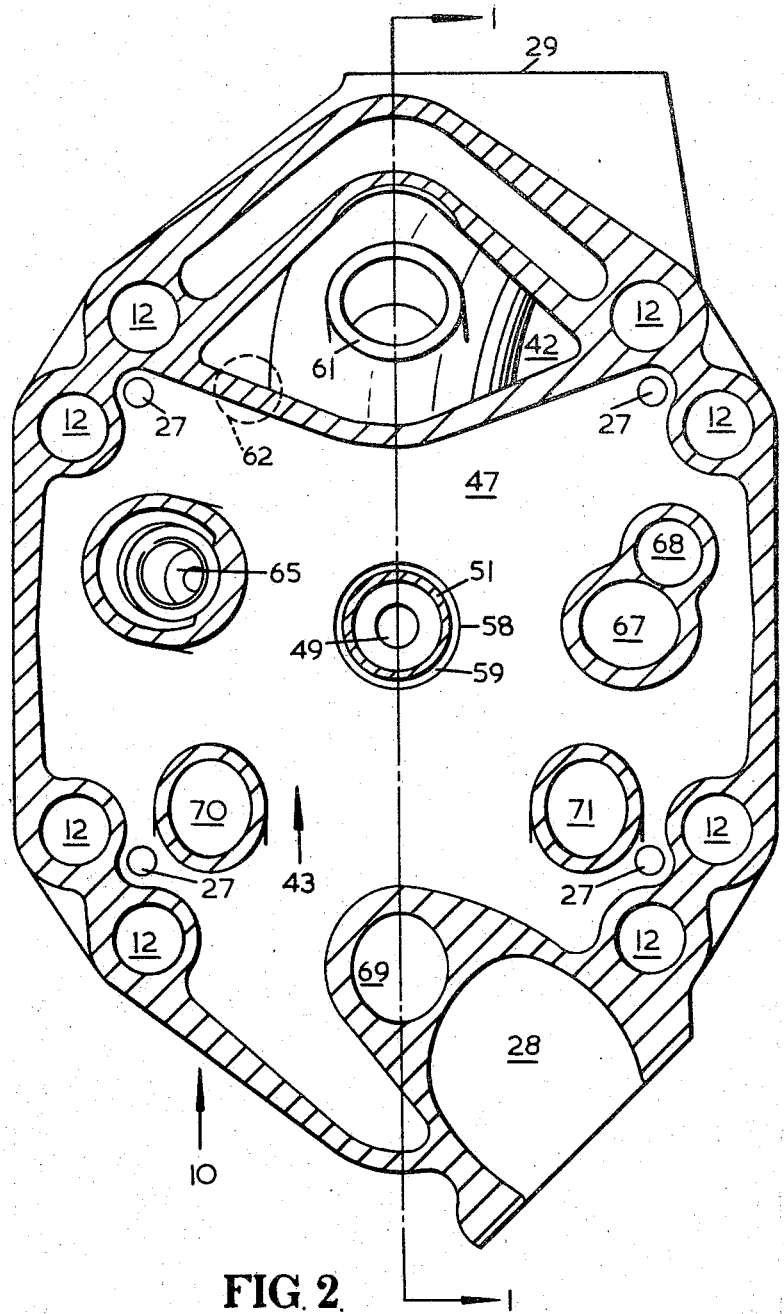
FIGURE 2 is a section taken along the line 2—2 of FIGURE 1 but omitting the fuel injector, the poppet valves and the valve guides.
Figure 3:
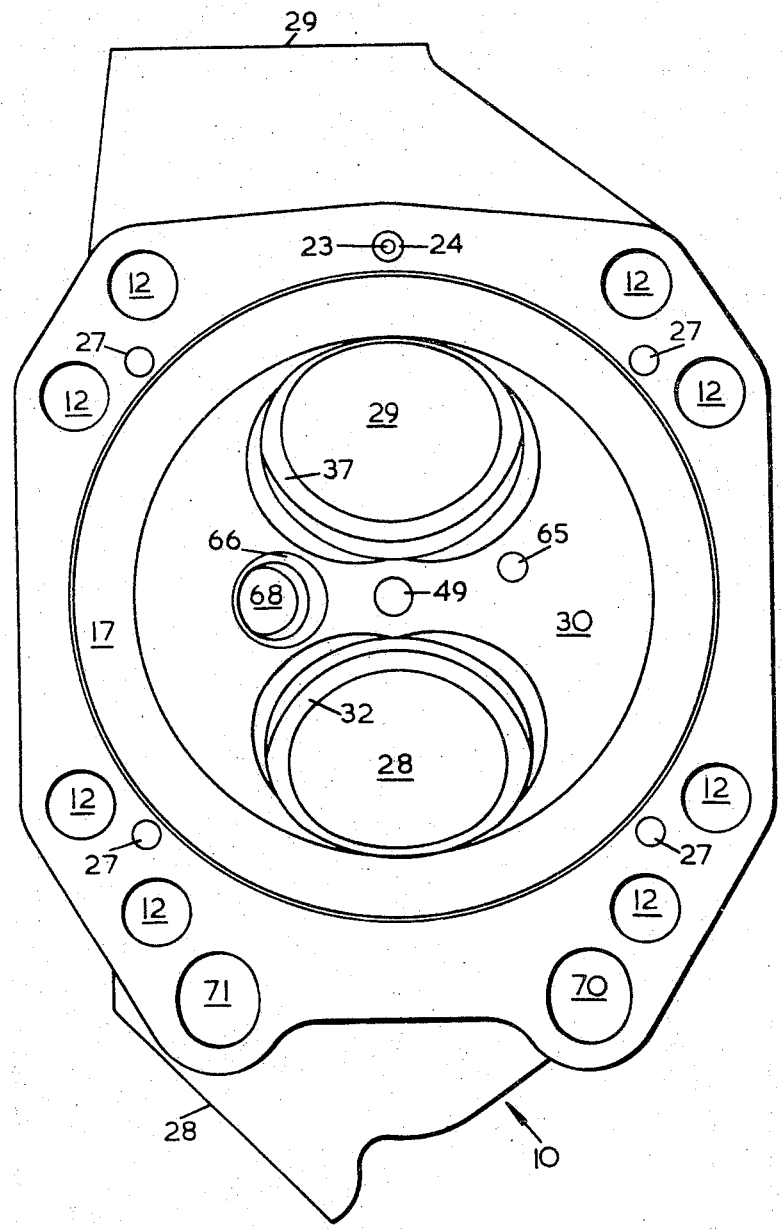
FIGURE 3 is an underplan view of the cylinder head as if taken on the line 3—3 of FIGURE 1 but omitting the fuel injector and the poppet valves.

In FIGURE 1 the cylinder head casting 10 is shown secured to a cylinder block 11 by eight unshown studs which are secured at their bottom ends to the cylinder block 11 and extend through holes 12 which are shown in FIGURES 2 and 3. As the operation of these studs is well-known in the art and does not form part of the present invention, it is not necessary to consider them in any detail. However it should be noted from the arrangement of the holes 12 that the eight studs are divided into four pairs, and that this arrangement of four pairs of small studs presents an advantage over the equivalent arrangement of four large single studs in that the diameter of holes 12 is kept comparatively small and the wall thickness of the casting surrounding the holes 12 is also kept comparatively small due to the smaller size of nut required for engaging the studs.

The cylinder block 11 has a cylindrical bore 13 coacting with a wet cylinder liner 14 which is provided with an outwardly extending annular flange 15 which is located axially by an annular step 16 formed in the cylinder block 11 and an annular step 17 formed in the cylinder head casting 10. An annular gas seal 18 is arranged in an annular groove in the end face of the cylinder liner 14 for coaction with the annular step 17 to prevent the passage of gas between the cylinder liner 14 and the cylinder head casting 10. A gasket 19 is arranged between the cylinder block 11 and the cylinder head casting 10.

The cylinder block 11 and the cylinder liner 14 define between them a space 20 into which cooling water is passed and flows through a series of five ports 21, only one of which is shown in FIGURE 1, formed in the cylinder block 11 for supplying cooling water to the cylinder head casting 10. The port 21 shown in FIGURE 1 communicates with the cylinder head casting 10, as indicated by arrow 22, through an orifice 23 formed in a bush 24 which extends through a hole 25 formed in the gasket 19 and is supported by a shoulder 26 of the cylinder block 11. The remaining four ports also communicate through bushes which are similar to bush 24 and are aligned with holes in the gasket 19 similar to hole 25, so as to communicate with respective ducts 27 which are seen in FIGURE 3.

The cylinder head casting 10 defines an air inlet passage 28 and an exhaust gas passage 29 which communicate with a substantially hemispherical combustion chamber 30 also defined by the cylinder head casting. The air inlet passage 28 is controlled by a poppet valve 31 which coacts with a valve seat insert 32 and is guided for axial sliding by a valve guide 33 extending directly from the air inlet passage 28 to a compartment 34 which is closed by a rocker cover part of which is indicated by reference numeral 35. The exhaust gas passage 29 is controlled by a poppet valve 36 which coacts with a valve seat insert 37 and is guided for axial sliding by a valve guide 38 of which the central portion is provided with a series of annular cooling fins 39. The valve guide 38 extends from the exhaust gas passage 29, through a water-filled space as will be described in detail later on, to a compartment 40 which is closed by a rocker cover part of which is indicated by reference numeral 41.

Two coolant chambers 42 and 43 are formed by the use of appropriate cores during the casting of the cylinder head 10, the two cored holes for the chamber 43 are bored out as indicated at 44 and are sealed by respective plugs 45 which are each provided with an annular sealing ring 46 and are held in place by the engagement of the rocker covers 35 and 41 with the cylinder head 10 as illustrated in FIGURE 1. The coolant chamber 42 is arranged immediately adjacent the wall of the cylinder head 10 defining the combustion chamber 30 and surrounds the portions of the cylinder head casting defining the air inlet passage 28 and the exhaust gas passage 29. The entire transverse shape of coolant chamber 43 is seen in FIGURE 2 and, as shown in FIGURE 1, the coolant chambers 42 and 43 are separated by a wall 47 which is formed as part of the cylinder head casting.

A fuel injector 48 is secured to the cylinder head casting 10 in a known manner and extends through a bore 49 formed in the wall of the combustion chamber 30 so that the injector nozzle 50 is arranged intermediate the inlet valve 31 and the exhaust valve 36. The fuel injector 48 passes through a tubular sleeve 51 of which one end has a spigotal engagement 52 with the cylinder head casting 10 adjacent the bore 49, and the other end is received in a bore 53 formed in the upper wall of the cylinder head casting. Annular water seals 54 and 55 are arranged at the two junctions of the sleeve 51 with the cylinder head casting to prevent cooling water from leaking into the sleeve 51 from the coolant chambers 42 and 43 and, in this manner, the fuel injector 48 is isolated from the corrosive properties of the cooling water. An annular gas seal 56 is trapped between an annular ledge 57 of the fuel injector 48 and the cylinder head casting surrounding the bore 49 to prevent gas under pressure from escaping between the fuel injector and the bore 49.

The sleeve 51 passes with radial clearance through a coaxial hole 58 formed through the wall 47 thus defining an annular passage 59 interconnecting the coolant chambers 42 and 43. The main flow of cooling water into the cylinder head casting is from cooling space 20 through the four ducts 27 which discharge into the coolant chamber 43 as will be appreciated from FIGURE 2. From the ducts 27 the cooling water flows generally inwards towards the sleeve 51 and passes through the annular passage 59 into chamber 42 where it impinges on the portion of the cylinder head casting intermediate the injection nozzle 50 and the valves 31 and 36 as indicated by arrows 60 in FIGURE 1. The cooling water then flows generally outwardly towards a boss 61 supporting the exhaust valve guide 38 and passes through a water outlet which is formed in the face of the cylinder head casting adjacent the rocker cover 41. Although the water outlet cannot be seen in the drawings, its position is indicated by the dotted circle 62 in FIGURE 2.

It is generally well-known in the art of internal combustion piston engines that different zones of a cylinder head are subjected to different operating temperatures and that steep temperature gradients can occur between these zones thereby generating high thermal stresses in the material defining the cylinder head. In particular the zones surrounding the exhaust valve 36, the exhaust gas passage 29 and the fuel injection nozzle 50 will tend to be at a much higher temperature than the zones surrounding the inlet valve 31 and the air inlet passage 28. Accordingly it is important to arrange for heat to be transferred at a higher rate from the hotter zones than the comparatively cooler zones. We have hitherto arranged cylinder heads so that the axes of the fuel injector 48 and the valves 31 and 36 are parallel, and we have discovered that the hardest part of the cylinder head casting to cool is the junction of the hot zones surrounding the exhaust valve seat 37 and the injection nozzle 50, as it is difficult to get adequate cooling passages into this portion of the cylinder head casting. With the present invention we have overcome this particular problem by inclining the axes of the valves 31 and 36 away from the axis of the fuel injector 48 so as to enable the cooling water to reach this aforesaid junction of hot zones, and by arranging the annular passage 59 to direct a jet of cooling water to pass along the sleeve 51 and impinge on this junction. This particular solution has the added advantage that the inclination of the axes of valves 31 and 36 allows extra large ports to be employed such that the port area of the two valves shown is comparable with the port area of a four valve arrangement in a flat-ended combustion chamber of the same bore.

Due to the position of the water outlet 62 a flow of water is not forced around the walls of the cylinder head casting defining the air inlet passage 28 and, as this is a zone of comparatively low temperature, the normal convection currents set up in the coolant chamber 42 are sufficient to maintain the air inlet passage at a satisfactory working temperature. However, the flow of cooling water around the comparatively hot zone presented by the portion of the cylinder head casting defining the exhaust gas passage 29 tends to be restricted to the side presented to the wall 47 due to the position of the annular passage 59 and the water outlet 62. In view of this, the orifice 23 is arranged to discharge a jet of water direct from the space 20 to impinge on the side of the exhaust gas passage 29 remote from the wall 47. As will be appreciated from FIGURE 1, the annular fins 39 of the exhaust valve guide 38 are exposed to the action of the cooling water in the coolant chamber 42 and annular seals 63 and 64 are arranged between the cylinder head casting 10 and the exhaust valve guide 38 respectively to prevent leakage of cooling water into the chamber 40 or into the exhaust gas passage 29.

It will be appreciated that the comparative sizes of the orifice 23 and the annular passage 59 may be altered to give any desired cooling effect, and that further passages may be provided through the wall 47 to direct jets of cooling water from coolant chamber 43 to impinge on any desired portion of the cylinder head casting. Also if desired the annular passage 59 may be made in the form of a nozzle instead of parallel sided as shown, and may be defined by a valve seat insert supported by the wall 47. The annular passage 59 may also be replaced, if desired, by any conveniently shaped passage or arrangement of passages in order to direct the cooling water to impinge on a desired area.

The cylinder head shown is for a diesel engine and, as shown in FIGURES 2 and 3, is provided with a passage 65 for mounting a well-known device for indicating the pressure in the combustion chamber and for limiting the maximum pressure attainable in the combustion chamber. A valve seat 66 is provided, as is well-known in the art, for an air starter valve which is to be supported by a valve guide carried by a bore 67 and controls an air passage 68. The inlet valve guide 33 is carried by a bore 69 of the cylinder head casting as indicated in FIGURE 2, and a pair of inclined passages 70 and 71 are formed through the cylinder head casting as shown in FIGURES 2 and 3 for accommodating push-rods for operating the valves 31 and 36 through appropriate well-known rocker mechanisms and return springs arranged in the rocker covers 35 and 41.

Although the nivention has been described with reference to a cylinder head casting for a single cylinder, the casting shown could readily be extended, if desired, for two or more cylinders.

What I claim as my invention and desire to secure by Letters Patent of the United States is:

1. A liquid-cooled cylinder head, for a fuel injection internal combustion piston engine, comprising a plurality of liquid-impervious and gas-impervious walls defining an air inlet passage, an exhaust gas passage, a first coolant chamber surrounding said exhaust gas passage, a coolant outlet from said first coolant chamber, a second coolant chamber, and a coolant inlet to said first coolant chamber, said cylinder head defining a second coolant inlet arranged to deliver coolant directly into the first coolant chamber to impinge on the exhaust gas passage, said coolant outlet being arranged adjacent the exhaust gas passage whereby substantially all the coolant that flows through the cylinder head will also flow over the exhaust gas passage, one of said walls defining a substantially part spherical surface for forming a boundary of a combustion chamber, said air inlet passage and said exhaust, gas passage extending through said one wall into said combustion chamber, said first coolant chamber arranged immediately adjacent said one wall, another of said walls separating the first coolant chamber from the second coolant chamber whereby the first coolant chamber is arranged intermediate the second coolant chamber and said combustion chamber, said one wall defining inlet and exhaust valve seat means respectively at the junctions of the air inlet and exhaust gas passages with said combustion chamber, said inlet and exhaust valve seat means lying in respective inclined planes each substantially tangential to said part spherical surface for engagement by the heads of respective poppet valves, said cylinder head defining valve guide means for supporting the said poppet valves such that the poppet valve for the air inlet passage will be inclined away from the poppet valve for the exhaust gas passage, said one wall defining a seating between said inlet and exhaust valve seat means for supporting a fuel injector, said another wall defining a coolant passage interconnecting the first and second coolant chambers, and said coolant passage being arranged to direct a flow of coolant from the second coolant chamber to impinge on the said one wall between the seating for the fuel injector and the inlet and exhaust valve seat means.

2. The liquid-cooled cylinder head, as in claim 1, in which said coolant passage constitutes an axially-elongated nozzle whereby the coolant flowing through said axially-elongated nozzle will impinge on said one wall between the seating for the fuel injector and the inlet and exhaust valve seat means as a high velocity jet.

3. A liquid-cooled cylinder head, for a fuel injection internal combustion piston engine, comprising a plurality of liquid-impervious and gas-impervious walls defining an air inlet passage, an exhaust gas passage, a first coolant chamber surrounding said exhaust gas passage, a coolant outlet from said first coolant chamber, a second coolant chamber, and a coolant inlet to said first coolant chamber, said cylinder head defining a second coolant inlet arranged to deliver coolant directly into the first coolant chamber to impinge on the exhaust gas passage, said coolant outlet being arranged adjacent the exhaust gas passage whereby substantially all the coolant that flows through the cylinder head will also flow over the exhaust gas passage, one of said walls defining a substantially part spherical surface for forming a boundary of a combustion chamber, said air inlet passage and said exhaust gas passage extending through said one wall into said combustion chamber, said first coolant chamber arranged immediately adjacent said one wall, another of said walls separating the first coolant chamber from the second coolant chamber whereby the first coolant chamber is arranged intermediate the second coolant chamber and said combustion chamber, an air inlet poppet valve, inlet valve seat means arranged at the junction of the air inlet passage and the combustion chamber for engagement by said air inlet poppet valve to close said air inlet passage, an exhaust gas poppet valve, exhaust valve seat means arranged at the junction of the exhaust gas passage and the combustion chamber for engagement by said exhaust poppet valve to close said exhaust gas passage, said inlet and exhaust valve seat means lying in respective inclined planes each substantially tangential to said part spherical surface, valve guide means supporting said air inlet poppet valve and said exhaust gas poppet valve for movement in respective directions normal to the said planes of the respective valve seats whereby the air inlet poppet valve is inclined away from the exhaust gas poppet valve, a fuel injector arranged intermediate said inlet valve seat means and said exhaust valve seat means and lying in the same plane as the air inlet poppet valve and the exhaust gas poppet valve said another wall defining a coolant passage interconnecting the first and second coolant chambers and surrounding said fuel injector, and said coolant passage being arranged to direct a flow of coolant from the second coolant chamber to impinge on the said one wall between the inclined air inlet and exhaust gas poppet valves and the fuel injector.

4. The liquid-cooled cylinder head, as in claim 3, in which said coolant passage constitutes an axially-elongated nozzle whereby the coolant flowing through said axially-elongated nozzle will impinge on said one wall between the seating for the fuel injector and the inlet and exhaust valve seat means as a high velocity jet.

(References on following page)

References Cited

UNITED STATES PATENTS

| | | | |
|---|---|---|---|
| 2,305,475 | 12/1942 | Jagersberger et al. | 123—41.77 X |
| 2,644,433 | 7/1953 | Anderson | 123—32 |
| 2,710,602 | 6/1955 | Mayback | 123—41.76 |
| 2,736,300 | 2/1956 | Flynn | 123—41.79 X |
| 2,753,853 | 7/1956 | Hands | 123—41.85 X |
| 2,785,664 | 3/1957 | Goldsmith | 123—41.31 |
| 2,858,813 | 11/1958 | Haas | 123—32 |
| 3,081,755 | 3/1963 | Kotlin et al. | 123—41.77 |
| 3,165,095 | 1/1965 | Adler | 123—41.82 |
| 3,174,467 | 3/1965 | Sampietro et al. | 123—32 |

MARK M. NEWMAN, *Primary Examiner.*

AL L. SMITH, *Examiner.*